United States Patent [19]

Beach et al.

[11] Patent Number: 4,998,574
[45] Date of Patent: Mar. 12, 1991

[54] CUTTING BIT AND BLOCK MOUNT

[75] Inventors: Wayne H. Beach, Roaring Spring; Steven D. Shirk, Altoona, both of Pa.

[73] Assignee: Kennametal Inc., Latrobe, Pa.

[21] Appl. No.: 534,019

[22] Filed: Jun. 1, 1990

Related U.S. Application Data

[63] Continuation-in-part of Ser. No. 444,659, Dec. 1, 1989, abandoned.

[51] Int. Cl.⁵ .............................................. B27G 13/04
[52] U.S. Cl. .................... 144/241; 144/2 N; 144/231; 144/235; 299/91; 299/92; 241/294
[58] Field of Search ............... 144/2 N, 218, 231, 241; 299/39, 79, 71, 91, 92; 241/294; 407/33, 42, 46, 47, 118

[56] References Cited

U.S. PATENT DOCUMENTS

| 608,272 | 8/1898 | Schleicher . |
| 1,164,659 | 12/1915 | Moore et al. . |
| 1,534,856 | 4/1925 | McKoy et al. . |
| 1,859,717 | 5/1932 | Rutrle . |
| 2,610,049 | 9/1952 | Elles et al. ........................ 299/91 |
| 2,798,715 | 7/1957 | Brown . |
| 2,976,028 | 3/1961 | Saxman . |
| 2,992,664 | 7/1961 | Shano . |
| 3,198,224 | 8/1965 | Hiley . |
| 3,205,015 | 9/1965 | Krekeler ........................ 299/91 X |
| 3,256,043 | 6/1966 | Krekeler ........................ 299/91 |
| 3,570,566 | 3/1971 | McCreery . |
| 3,732,905 | 5/1973 | Pickel . |
| 3,797,544 | 3/1974 | Ver Ploeg . |
| 3,844,619 | 10/1974 | Haller . |
| 3,935,887 | 2/1976 | Van Zante et al. . |
| 4,009,837 | 3/1977 | Schnyder . |
| 4,147,193 | 4/1979 | Kivimaa . |
| 4,214,617 | 7/1980 | McKenry . |
| 4,271,879 | 6/1981 | Shivers, Jr. et al. ............... 144/2 N |
| 4,757,848 | 7/1988 | Mollbers, Jr. . |
| 4,759,394 | 7/1988 | Clemennson . |

FOREIGN PATENT DOCUMENTS

| 996007 | 8/1976 | Canada . |
| 614221 | 12/1973 | U.S.S.R. . |
| 750612 | 6/1956 | United Kingdom . |
| 1550353 | 8/1979 | United Kingdom . |

OTHER PUBLICATIONS

Kennametal Minins Tools for Cutting and Drilling, Catalog M-6, pp. 1 & 4.

Primary Examiner—W. Donald Bray
Attorney, Agent, or Firm—Larry R. Meenan

[57] ABSTRACT

A cutting bit for mounting in a block mount. The cutting bit including a working head and a shank depending therefrom. The shank includes a recess formed within at least one side portion thereof. The block mount includes two matching half members secured on opposing sides of a rotating disc. A slot extends perpendicularly across at least one of the half members to receive the shank in a wedge like fit. Formed within the slot is a pin for mating engagement with the recess.

37 Claims, 5 Drawing Sheets

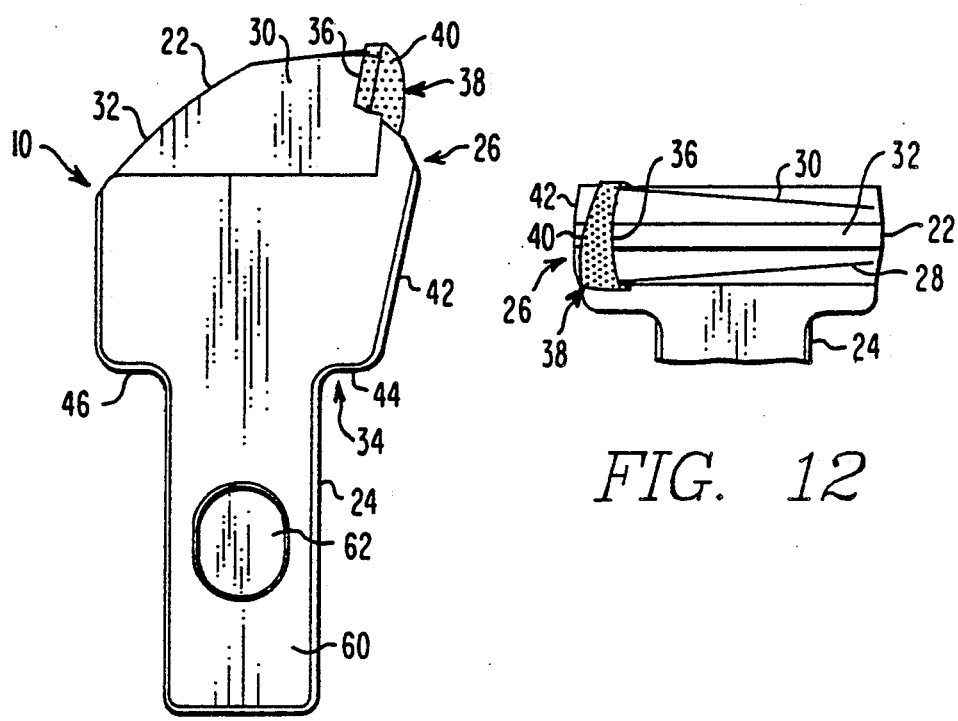
FIG. 11
FIG. 12
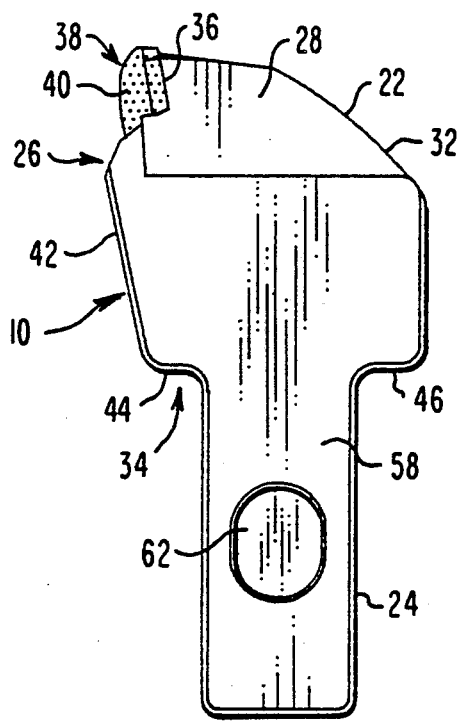
FIG. 13
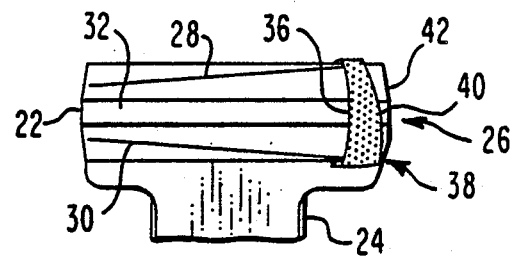
FIG. 14

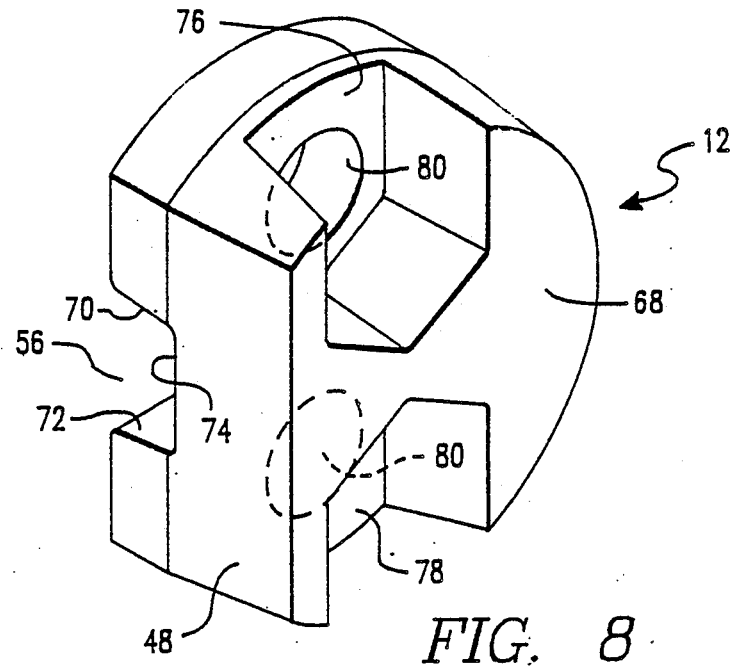
FIG. 8
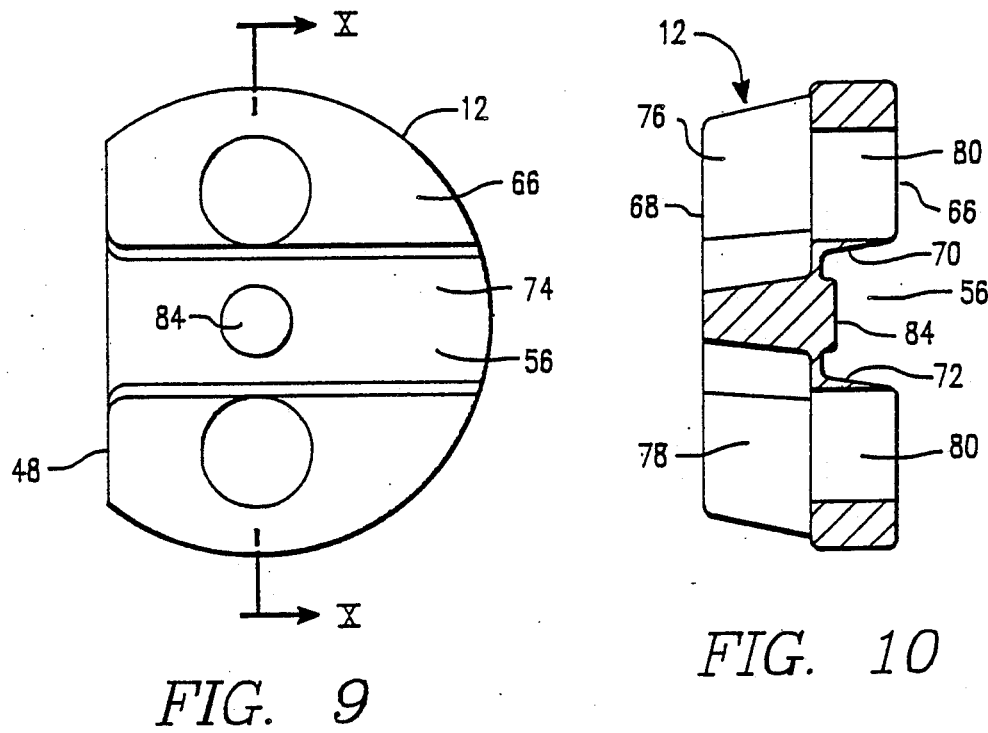
FIG. 9
FIG. 10

CUTTING BIT AND BLOCK MOUNT

This is a continuation-in-part of copending application Ser. No. 07/444,659 filed on Dec. 1, 1989, now abandoned.

FIELD OF THE INVENTION

This invention relates to cutting bit and block mount. More particularly, this invention relates to a cutting bit and block mount having matching half members for mounting a cutting bit to a rotatable disc of a tool such as a stump cutting device.

DESCRIPTION OF THE RELATED ART

Various devices are known for cutting a stump. One type of stump cutting device utilizes a powered rotatable disc having circumferentially mounted around the periphery thereof a plurality of cutting bits having cemented tungsten carbide tips. In operation, the disc of the stump cutting device is rotated to repeatedly present the cutting bits in cutting engagement across a tree stump surface. After each cut across the tree stump, the stump cutting device is moved laterally relative to the previous cut to begin a new cut across the tree stump surface until the stump is cut down to a desired level with respect to the ground surface. Such devices are generally disclosed in U.S. Pat. Nos. 4,759,394; 4,757,848; 4,214,617; 4,009,837; 3,935,887; 3,797,544; 3,570,566; 3,732,905, 3,198,224; 1,534,856; 1,164,659 and 2,992,664.

It will be appreciated that as the rotating disc of the stump cutting device cuts across a tree stump cross-section, the cutting bits and block mounts which hold the cutting bits relative to the rotating disc are exposed to extreme pressure as the cutting bit forcedly contacts the tree stump surface. This pressure often results in the bending, breaking or loosening of the cutting bit from the respective block mount. These conditions are exacerbated when the cutting bit contacts a rock, nail, or other hard object hidden within the tree stump.

In view of the foregoing, we have invented a novel cutting bit and block mount incorporating a retaining means to retain the cutting bit within the block mount. The cutting bit includes a working head and a shank depending therefrom. The shank has formed within at least one side thereof a pin retaining inner recess. The block mount has matching half members secured about the circumference of the rotatable disc on direct opposite sides thereof. Each half member includes a slot having a pin projecting transversely of the longitudinal length of the slot. The slot receives the shank of the cutting bit such that the pin retaining inner recess mates with the pin projecting from the slot to retain the cutting bit within the block mount.

Accordingly, an object of the present invention is to provide an improved cutting bit and block mount having matching half members for mounting the cutting bit to a rotatable vertical disc of a stump cutting device. It is another object of the present invention to provide a cutting bit having an enlarged hexagonal cross-sectional cutting bit shank for mating engagement with a complementary shaped slot formed within a half member of the block mount. Another object of the present invention is to provide a cutting bit having at least one pin retaining inner recess that mates with a pin in a slot of each respective matching half member of the block mount. Another object of the present invention is to provide a cutting bit having a streamlined working head to reduce the contact surface area between the heel of the working head and the stump surface as the cutting bit cuts through a stump. It will be appreciated that the reduced contact surface area of the streamlined cutting bit lessens the amount of drag created during the cutting cycle thereby resulting in less damaging heat buildup, less horsepower drain on the stump cutting device, and increased cutting bit penetration into the stump.

SUMMARY OF THE INVENTION

Briefly, according to this invention, there is provided a block mount having matching half members secured on opposite sides of a rotatable vertical disc of a tool and at least one cutting bit retained within the block mount. Each cutting bit includes a working head having a front cutting edge and a shank depending therefrom. The shank includes side portions and a pin retaining inner recess within at least one of the side portions. In a preferred embodiment the shank is of a hexagonal cross-sectional shape having an inner recess within each side portion thereof.

The matching half members include a body portion. At least one of the body portions of the matching half members of the block mount includes a slot therein. In a preferred embodiment the half members are of an elongated semi-circular shape. The slot is formed perpendicularly across the diameter of each matching half member from approximately the middle of the straight side edge of the semi-circular half member and includes a pin projecting transversely from the slot for mating engagement with the pin retaining inner recess. Each slot is contoured to receive a shank in a wedge like fit such that the pin retaining inner recess, the pin, the slot, and the shank cooperatively prevent lateral and axial movement of the cutting bit relative to the half member.

BRIEF DESCRIPTION OF THE DRAWINGS

Further features and other objects and advantages of this invention will become clear from the following detailed description made with reference to the drawings in which:

FIG. 8 is a perspective view of one half member of a block mount as shown in FIG. 1;

FIG. 9 is a front view of the block mount of FIG. 8;

FIG. 10 is a sectional side view of the block mount of FIG. 9 taken about line X—X;

FIG. 11 is a side view of a right type cutting bit in accordance with the present invention;

FIG. 12 is a top view of the cutting bit of FIG. 11;

FIG. 13 is a side view of a left type cutting bit in accordance with the present invention; and FIG. 14 is a top view of the cutting bit of FIG. 13.

DETAILED DESCRIPTION OF THE PREFERRED EMBODIMENTS

Figure 1:
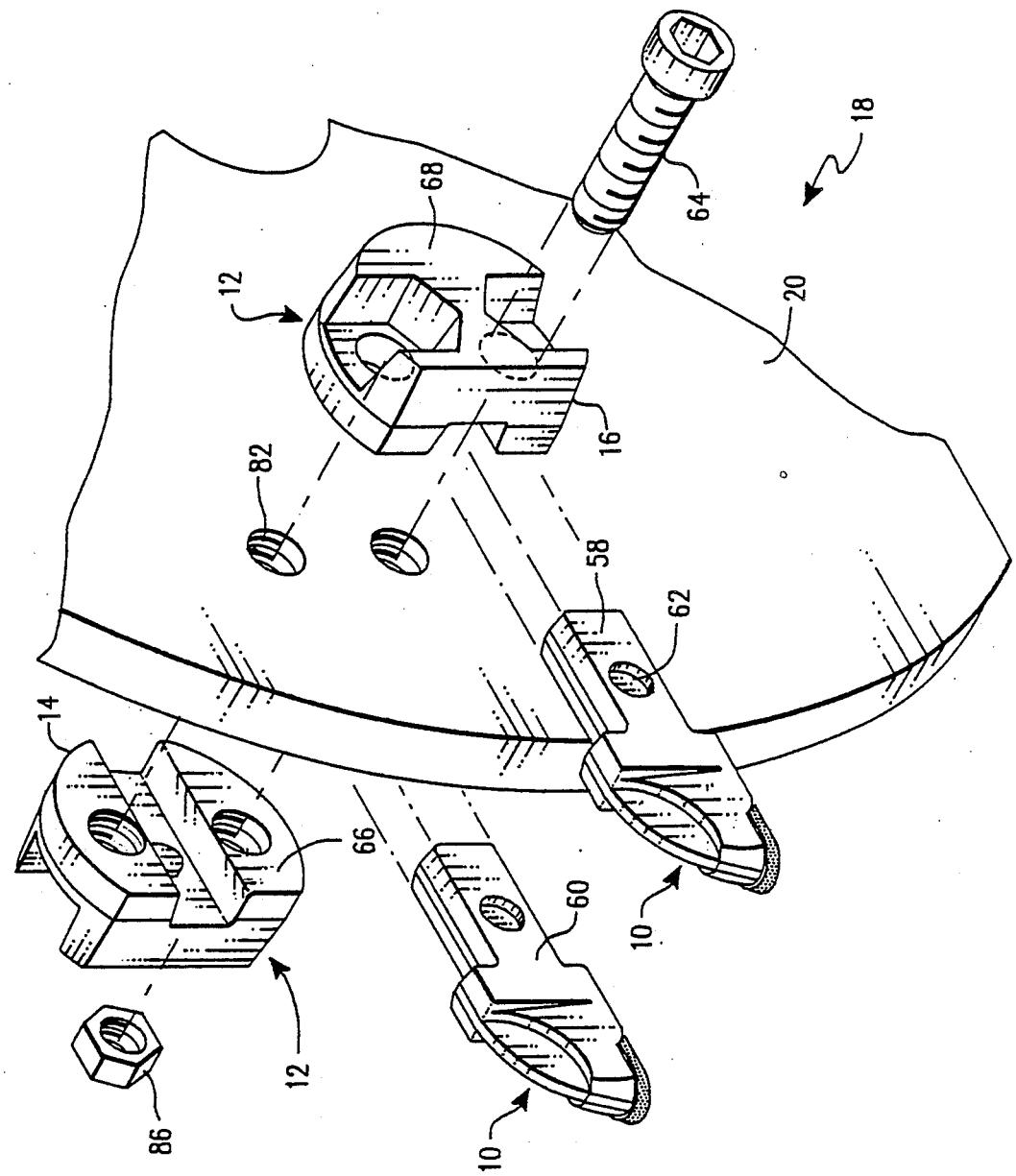
FIG. 1 is a partial perspective view of a vertical disc of a stump cutting device including a pair of cutting bits mounted within a pair of matching half members of a block mount.

Referring to the drawings, wherein like reference characters represent like elements, FIGS. 1–10 show a preferred cutting bit 10 and block mount 12 produced in accordance with the present invention for use in a tool such as a stump cutting device 18.

As shown in FIG. 1, a pair of cutting bits 10 are circumferentially mounted around the periphery of a rotatable vertical disc 20 of a stump cutting device 18. Each cutting bit 10 is retained within a matching half member 14 and 16 of the block mount 12 positioned on direct opposite sides of the vertical disc. It will be appreciated that due to the increased shank strength resulting from the present invention it is possible to eliminate various cutting bit positions on the disc to allow for even greater cutting efficiency; for example, only one half member of the block mount having a cutting bit mounted therein and fastened at a particular position about the periphery of the vertical disc may be used.

In operation, the vertical disc 20 of the stump cutting device 18 is rotated to force the cutting bits 10 extending radially from the periphery of the disc into contact with the stump surface thereby cutting a narrow passage across the stump surface. After each cut across the stump surface the stump cutting device 18 is moved laterally to present a new portion of the stump surface to be cut. This procedure may be repeated until the entire stump surface is removed.

Figure 4:
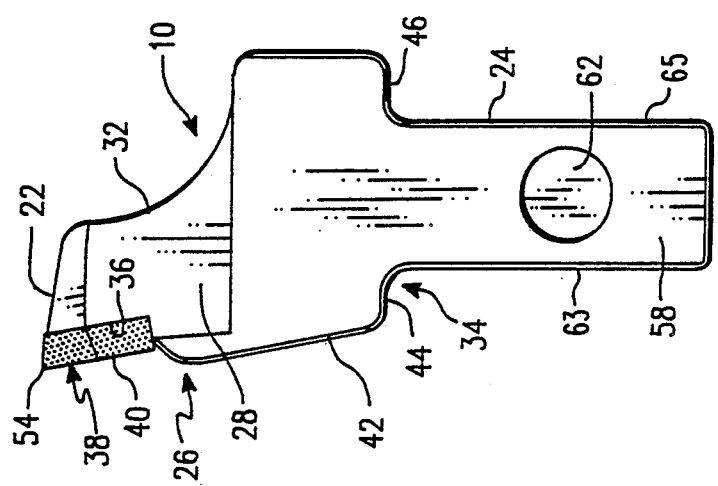
FIG. 4 is a side view of yet another cutting bit in accordance with the present invention.
Figure 3:
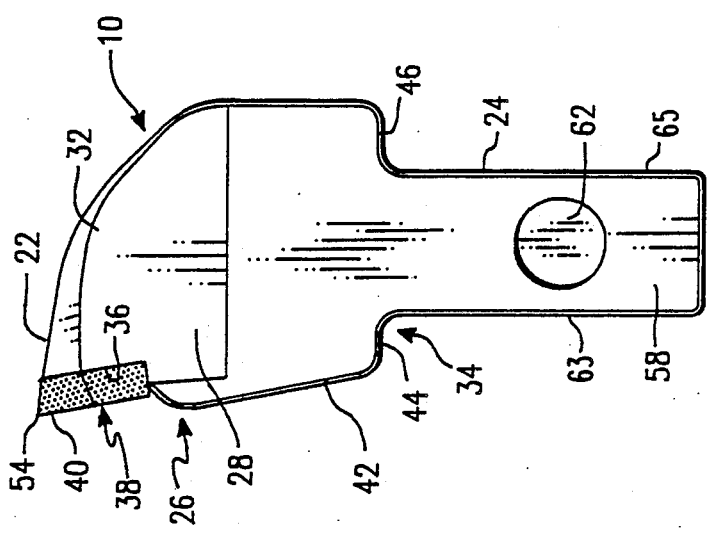
FIG. 3 is a side view of another cutting bit in accordance with the present invention.
Figure 2:
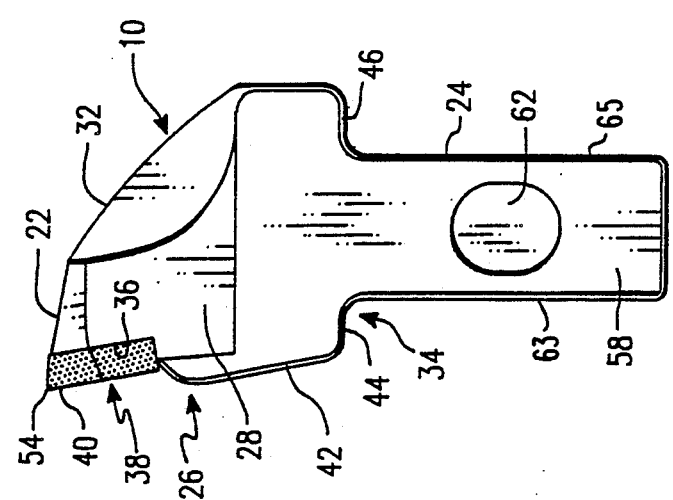
FIG. 2 is a side view of a cutting bit in accordance with the present invention.
Figure 5:
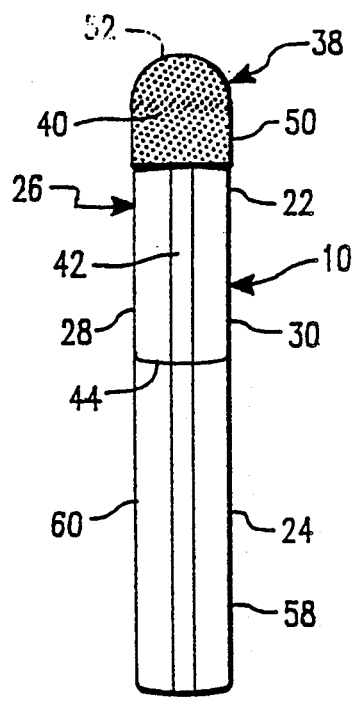
FIG. 5 is a front view of a straight type cutting bit of FIGS. 2, 3 or 4.
Figure 6:
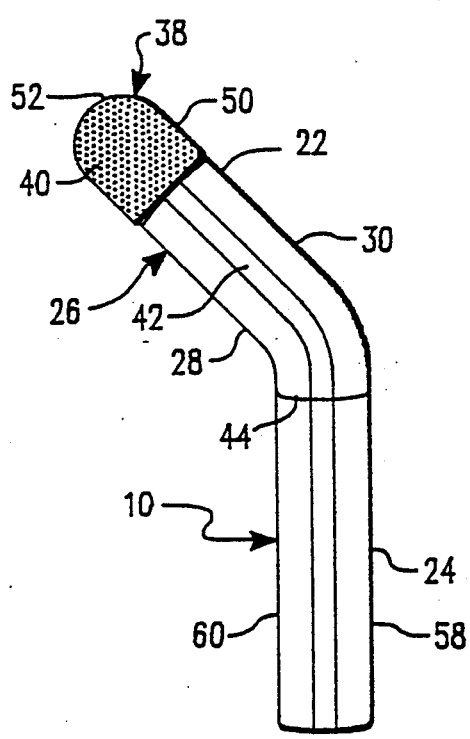
FIG. 6 is a front view of a left type cutting bit of FIGS. 2, 3 or 4.
Figure 7:
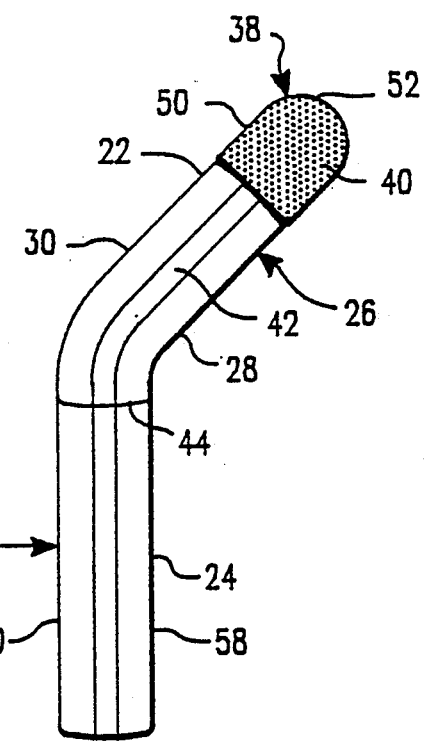
FIG. 7 is a front view of a right type cutting bit of FIGS. 2, 3 or 4.

A cutting bit 10 according to the present invention is shown in FIGS. 2, 3, and 4. The cutting bit 10 includes a working head 22 having a shank 24 depending therefrom. The working head 22 is generally of a polygonal shape having a front cutting edge 26, flat parallel side faces 28 and 30, a heel 32, and a flat bottom portion 34.

The front cutting edge 26 contains a pocket 36 in which is recessed a cutting insert 38. Positioned below the cutting insert 38 and projecting forwardly beyond a front face 40 of the insert is a boss member 42. Because the boss member 42 projects forwardly of the front face of the cutting insert, the cutting insert is protected from damage from hard objects such as a rock, a steel stake, or a splitting wedge and the like which may be hidden within the stump and/or root system during the growth of the tree. More particularly, as the cutting bit passes through the stump, the cutting bit penetrates underneath the hard object such that the object contacts the boss member 42 before the object contacts the cutting insert 38.

In a preferred embodiment the boss member 42 and face 40 of the cutting insert 38 are angled from the longitudinal axis of the shank 24 of the cutting bit 10 to provide clearance for the cutting bit as the cutting bit rotatably cuts in a counter clockwise direction through a stump.

The heel 32 of the cutting bit 10 may be of most any shape. In a preferred embodiment the heel may be either of a convex shape as shown in FIGS. 2 and 3 or of a concave shape as shown in FIG. 4. The side faces 28 and 30 of the cutting bit 10 are tapered toward the heel 32 such that the side faces and the heel cooperatively provide a streamlined working head 22 to reduce the contact surface area between the rear portion of the working head and the stump surface as the cutting bit 10 cuts through a stump. It will be appreciated that the streamlined cutting bit 10 lessens the amount of drag created during the cutting process thereby resulting in less damaging heat buildup, less horsepower drain on the stump cutting device, and increased cutting bit penetration into the stump.

The flat bottom portion 34 of the working head 22 includes a pair of shoulders 44 and 46 on opposite sides of the shank 24 for engagement with a straight side edge 48 of the half member of the block mount 12 to be more fully described herein. As shown, the corners and edges of the working head 22 may also be shaped to increase the streamline effect of the cutting bit 10 and facilitate in the passing of the cutting bit through a stump during the cutting process.

Any suitable hard, wear resistant insert may be used in accordance with the present invention. In a preferred embodiment the cutting insert 38 is formed from cemented tungsten carbide. As shown in FIGS. 2–7, the cutting insert 38 has a flat front face 40 and side portions 50 connected to a rounded top portion 52 to form a cutting edge 54 of arcuate shape at the juncture of the rounded top portion and the front face. In an alternative embodiment of the present invention as shown in FIGS. 11–14, the front face 40 of the cutting insert 38 may be angled with respect to the pocket 36. More particularly, the front face 40 of the cutting insert 38 forms an acute angle to the cutting plane of the respective cutting bit. It will be appreciated that a cutting insert having a front face 40 at an acute angle to the cutting plane of the respective cutting bit allows material such as wood chips which are removed by the cutting bit, to be directed away from an uncut area of the stump toward an open area already cut.

Depending from between shoulders 44 and 46 of the flat bottom portion 34 of the working head 22 is a shank 24. The shank 24 is shaped to conform to a matching slot 56 formed within each respective half member 14 and 16 of the block mount 12. The shape of the shank 24 and matching slot 56 cooperatively allows for multiple surface contact between the shank and half member. Any suitably shaped shank that provides at least two points of surface contact between the shank 24 and a matching slot 56 may be used.

In a preferred embodiment, as shown in FIG. 1, the shank is of a hexagonal cross-sectional shape. The hexagonal cross-sectional shape of the shank 24 provides at least two points of surface contact with the matching slot 56 formed within each respective half member 14 and 16. It will be appreciated that the multiple surface contact between the shank 24 and matching slot 56 securely holds the cutting bit within the half member of the block mount 12 and distributes the cutting pressure exerted upon the cutting bit 10 to the block mount 12 to prevent bending, breaking or loosening of the cutting bit from the block mount.

Provided within at least one side portion 58 and 60 of the shank 24 is a pin retaining inner recess 62. The pin retaining inner recess 62 is spaced from a forward edge 63 and a rearward edge 65 of the shank and is of a shape and size to receive a pin 84 formed within the shank receiving slot 56 to be more fully described herein. It will be appreciated that any shape and size inner recess 62 may be used that allows for a clearance fit between the outer periphery of the pin 84 and inner edge of the recess and prevent excessive axial and lateral movement of the pin relative to the pin retaining inner recess. In a preferred embodiment the inner recess 62 is of a shape and size to provide a loose type fit with pin 84. As shown in FIGS. 2–4, the pin retaining inner recess 62 may be either oval or circular shaped. In a preferred embodiment a pin retaining inner recess 62 is formed within each opposing side 58 and 60 of the shank 24. The pin retaining inner recess 62 is formed within each side 58 and 60 of the shank 24 such that the cutting bit 10 is interchangeable between matching half members 14 and 16 of the block mount 12.

As shown in FIG. 1, a cutting bit 10 may be mounted within each matching half member 14 and 16 of the block mount 12 and secured to the vertical disc 20 by transverse fasteners 64 such as bolts and the like. Half member 14 of the block mount 12 is a mirror image of half member 16 of the block mount secured on the directly opposing side of the vertical disc 20.

Each half member may be of any suitable shape to retain the cutting bit. In a preferred embodiment, each half member 14 and 16 of the block mount 12 is substantially semi-circular in shape having a straight side edge 48, a flat front face 66 and an opposing back face 68. The front face of the half member is positioned toward the vertical disc 20 and has formed therein a slot 56. Slot 56 is contoured to conform to the shape of the shank 24 of the cutting bit 10. In a preferred embodiment slot 56 has angled sides 70 and 72 and a substantially flat bottom 74 extending perpendicularly across the diameter of the block mount 12 from approximately the middle of the straight side edge 48 of the semi-circular shaped half member. The slot 56 is of a depth slightly less than the depth of the shank cross-section such that when the block mount 12 is secured against the disc 20 only the shank of the cutting bit contacts the disc. In a preferred embodiment the angled sides 70 and 72 of the slot 56 are tapered toward the bottom 74 of the slot at an angle of approximately 10 degrees with respect to vertical to provide a wedge like fit and at least three points of contact between the shank 24 and the angled sides 70 and 72 of the slot and the disc 20 to ensure that there is little if any movement of the cutting bit 10 within the half member of the block mount 12.

The back face 68 of each half member 14 and 16 of the block mount 12 has recessed therein two cutouts 76 and 78. The cutouts may be of any suitable shape to allow a tightening nut and bolt head to pull flush within the cutouts as more fully described herein. In a preferred embodiment the cutouts 76 and 78 are of a partial hexagonal shape and are positioned one on each side of the slot 56. Each cutout has a concentrically aligned hole 80 to receive a fastener 64 that passes from the back face 68 through the front face 66 of the half member 14, through a preformed hole 82 within the disc 20, then through the hole 80 within the front face 66 and back face 68 of the matching opposing half member 16. It will be appreciated that the cutouts 76 and 78 allow tightening nuts and heads of the bolts to pull within the cutouts substantially flush with the back face 68 of each matching half member 14 and 16 of the block mount 12.

Projecting from approximately the middle of the slot 56 is a pin 84 that mates with the pin retaining inner recess 62 formed within the sides 70 and 72 of the shank 24 of the cutting bit 10. Although the pin 84 as shown is of a cylindrical shape, the pin may be of any shape and size that will fit within the inner recess 62 of the shank 24.

In operation, a shank 24 of a cutting bit 10 is positioned within a slot 56 of each respective half member 14 and 16 of the block mount 12. A pair of fasteners 64 such as bolts of any suitable type are then inserted into and through holes 80 within the half member 14 of the block mount 12, through holes 82 within disc 20, and through holes 80 in matching half member 16 of the block mount. Nuts 86 are then tightened on the threaded portion of the bolts to pull the shank of the cutting bits within matching half members 14 and 16 of the block mount 12 and against the disc 20 and pull the respective heads of the bolts and tightening nuts within the partial hexagonal shaped cutouts 76 and 78. As the shanks 24 of the cutting bits 10 are pulled within slots 56 of matching half members 14 and 16, the pins 84 projecting from the slots are forced into mating engagement with the pin thereby retaining inner recesses 62 within the shanks to cooperatively form a locking mechanism to prevent excessive lateral and axial movement of the cutting bits relative to the respective half members when the cutting bits are mounted within the block mounts secured to the disc 20.

The cutting bits 10 may be simply removed from the block mount 12 by first loosening the nuts 86 and if necessary, removing the fasteners 64 from the holes 80 and 82 and then disengaging the shanks 24 from the slots 56 of each half member 14 and 16.

Having described presently preferred embodiments of the invention it is to be understood that it may be otherwise embodied within the scope of the appended claims.

What is claimed is:

1. A cutting bit comprising:
a working head having a front cutting edge; and
a shank depending from said working head, said shank having side portions and forward and rearward edges and a pin retaining inner recess spaced from said edges extending transverse to a direction of travel of said cutting bit within at least one of said side portions.

2. The cutting bit as set forth in claim 1 wherein said shank has directly opposing pin retaining inner recesses formed within at least two of said side portions of said shank.

3. The cutting bit as set forth in claim 2 wherein said shank is of a hexagonal cross sectional shape.

4. The cutting bit as set forth in claim 3 wherein said working head includes parallel side faces, a heel, and a bottom formed integral with said side faces and said heel; said side faces tapered toward said heel such that said side faces and said heel cooperatively provide a streamlined working head.

5. The cutting bit as set forth in claim 4 wherein said heel is of a convex shape.

6. The cutting bit as set forth in claim 4 wherein said heel is of a concave shape.

7. The cutting bit as set forth in claim 2 wherein said cutting insert is made from cemented tungsten carbide.

8. The cutting bit as set forth in claim 7 further comprising a boss member formed integral with said front cutting edge and positioned below said cutting insert, said boss member projecting forwardly beyond said cutting insert to protect said cutting insert.

9. A half member of a block mount for securing a cutting bit to a rotatable disc, said half member comprising a body portion having a slot therein, and a pin projecting transversely from said slot.

10. The half member as set forth in claim 9 wherein said slot extends across the diameter of said body portion.

11. The half member as set forth in claim 10 wherein said body portion is of a substantially elongated semi-circular shape having a straight side edge, a flat front face and an opposing back face.

12. The half member as set forth in claim 11 wherein said slot extends perpendicularly across said flat front face from approximately the middle of said straight portion of said semi-circular shaped body portion.

13. The half member as set forth in claim 12 wherein said slot has angled sides and a flat bottom, said angled sides are tapered toward said flat bottom of said slot.

14. The half member as set forth in claim 13 wherein said back face includes at least two cutouts positioned one on each side of said slot, said cutouts each having a concentrically aligned hole to receive a fastener to secure said half member and the cutting bit to the disc.

15. A tool including a rotatable disc comprising:
at least one cutting bit, said cutting bit including a working head and a shank depending from said working head, said shank having side portions and an inner recess within at least one of said side portions; and
at least one block mount including two half members secured on opposite sides of said disc, at least one half member of said block mount having a slot therein, said slot including a pin for mating engagement with said recess such that said slot, said recess, and said pin cooperatively retain said cutting bit to the rotatable disc.

16. The tool as set forth in claim 15 wherein said slot is contoured to receive said shank of said cutting bit in a wedge like fit.

17. The tool as set forth in claim 16 wherein said half member is of a substantially semi-circular shape.

18. The tool as set forth in claim 17 wherein said slot extends perpendicularly across said half member from approximately the middle of a straight portion of the semi-circular shaped half member.

19. The tool as set forth in claim 18 wherein said shank is of a substantially uniform cross-sectional shape having directly opposing recesses formed within at least two of said side portions of said shank.

20. The tool as set forth in claim 19 wherein said shank is of a hexagonal cross-sectional shape.

21. The tool as set forth in claim 20 wherein said slot has angled sides and a flat bottom, said angled sides are tapered toward said bottom of said slot to provide a wedge like fit and at least two points of contact between said shank and said angled sides of said slot.

22. The tool as set forth in claim 21 wherein said working head includes parallel side faces, a heel, and a bottom formed integral with said side faces and said heel; said side faces tapered toward said heel such that said side faces and said heel cooperatively provide a streamlined working head.

23. The tool as set forth in claim 22 wherein said heel is of a convex shape.

24. The tool as set forth in claim 22 wherein said heel is of a concave shape.

25. The tool as set forth in claim 22 wherein said cutting insert is made from cemented tungsten carbide.

26. The tool as set forth in claim 25 further comprising a boss formed integral with said front cutting edge and positioned below said cutting insert, said boss member projecting forwardly beyond said cutting insert to protect said cutting insert.

27. A tool including a rotatable disc comprising:
at least one cutting bit, said cutting bit including a working head and a shank depending from said working head, said shank having side portions and an inner recess within at least one of said side portions; and
at least one block mount including at least one half member secured to a side of said disc, said half member of said block mount having a slot therein, said slot including a pin for mating engagement with said recess such that said slot, said recess, and said pin cooperatively retain said cutting bit to the rotatable disc.

28. The cutting bit as set forth in claim 1 wherein said front cutting edge includes a pocket in which is recessed a cutting insert.

29. The cutting bit as set forth in claim 22 wherein said front cutting edge includes a pocket in which is recessed a cutting insert.

30. The cutting bit as set forth in claim 28 wherein said cutting insert includes an angled front face.

31. The cutting bit as set forth in claim 28 wherein said cutting insert includes a flat front face.

32. The cutting bit as set forth in claim 29 wherein said cutting insert includes an angled front face.

33. The cutting bit as set forth in claim 29 wherein said cutting insert includes a flat front face.

34. A cutting bit comprising:
a working head having a front cutting edge, parallel side faces, a heel, and a bottom formed integral with said side faces and said heel; said side faces tapered toward said heel such that said side faces and said heel cooperatively provide a streamlined working head: and
a shank of a hexagonal cross sectional shape depending from said working head, said shank having side portions and directly opposing pin retaining inner recesses extending transverse to a direction of travel of said cutting bit formed within at least two of said side portions of said shank.

35. A cutting bit comprising:
a working head having a front cutting edge wherein said front cutting edge includes a pocket in which is recessed a cutting insert made from cemented tungsten carbide;
a boss member formed integral with said front cutting edge and positioned below said cutting insert, said boss member projecting forwardly beyond said cutting insert to protect said cutting insert; and
a shank depending from said working head, said shank having side portions and a pin retaining inner recess extending transverse to a direction of travel of said cutting bit within at least one of said side portions.

36. The cutting bit as set forth in claim 34 wherein said heel is of a convex shape.

37. The cutting bit as set forth in claim 34 wherein said heel is of a concave shape.

* * * * *